United States Patent
Cha et al.

(10) Patent No.: US 12,020,437 B2
(45) Date of Patent: Jun. 25, 2024

(54) COMPUTER-IMPLEMENTED METHOD OF ANALYZING AN IMAGE TO SEGMENT ARTICLE OF INTEREST THEREIN

(71) Applicant: University of Manitoba, Winnipeg (CA)

(72) Inventors: Young Jin Cha, Winnipeg (CA); Wooram Choi, Winnipeg (CA)

(73) Assignee: University of Mantoba, Winnipeg (CA)

( * ) Notice: Subject to any disclaimer, the term of this patent is extended or adjusted under 35 U.S.C. 154(b) by 379 days.

(21) Appl. No.: 17/611,956

(22) PCT Filed: Jun. 3, 2020

(86) PCT No.: PCT/CA2020/050758
§ 371 (c)(1),
(2) Date: Nov. 17, 2021

(87) PCT Pub. No.: WO2020/243826
PCT Pub. Date: Dec. 10, 2020

(65) Prior Publication Data
US 2022/0254030 A1      Aug. 11, 2022

Related U.S. Application Data

(60) Provisional application No. 62/871,483, filed on Jul. 8, 2019, provisional application No. 62/857,123, filed on Jun. 4, 2019.

(51) Int. Cl.
*G06T 7/11* (2017.01)
(52) U.S. Cl.
CPC ...... *G06T 7/11* (2017.01); *G06T 2207/20081* (2013.01); *G06T 2207/20084* (2013.01)

(58) Field of Classification Search
CPC . G06T 2207/20084; G06T 2207/20081; G06T 7/11; G06V 10/82
See application file for complete search history.

(56) References Cited

U.S. PATENT DOCUMENTS

| | | | |
|---|---|---|---|
| 2019/0179674 A1* | 6/2019 | Huang | G06N 3/063 |
| 2020/0170564 A1* | 6/2020 | Jiang | G06T 7/0012 |

(Continued)

FOREIGN PATENT DOCUMENTS

| | | |
|---|---|---|
| EP | 3 514 733 A1 | 1/2018 |
| WO | WO 2018/103736 A1 | 6/2018 |

OTHER PUBLICATIONS

Cha et al, "Deep Learning-Based Crack Damage Detection Using Convolutional Neural Networks", Computer-Aided Civil and Infrastructure Engineering, May 2017, vol. 32, No. 5, pp. 361-378, https://onlinelibrary.wiley.com/doi/abs/10.1111/mice.12263, Figure 2.

(Continued)

*Primary Examiner* — Margaret G Mastrodonato
(74) *Attorney, Agent, or Firm* — Kyle R Satterthwaite; Ryan W Dupis; Ade & Company Inc.

(57) ABSTRACT

A computer-implemented method of analyzing an image to segment an article of interest in the image comprises (i) receiving the image having a width of $n_1$ pixels, a height of $n_2$ pixels and a depth of d channels; (ii) processing the image using a machine learning algorithm configured to segment the article of interest, the machine learning algorithm comprising a convolutional neural network including: at least one convolution layer; after said at least one convolution layer, at least one separable convolution module comprising a series of separable convolutions, each separable convolution comprising a depthwise convolution and a pointwise convolution; after said at least one separable convolution module, a pooling module; and a decoder module after the (Continued)

pooling module; and (iii) displaying the image with location of the article of interest being indicated if determined to be present by the machine learning algorithm.

17 Claims, 6 Drawing Sheets

(56) References Cited

U.S. PATENT DOCUMENTS

2020/0218948 A1\* 7/2020 Mao ................... G06V 10/7715
2022/0261993 A1\* 8/2022 Yoo ...................... A61B 5/7267

OTHER PUBLICATIONS

Srivastava et al, "Dropout: A simple way to prevent neural networks from over-fitting", The Journal of Machine Learning Research, 2014 vol. vol. 15 (No. 1), pp. 1929-1958, http://www.jmlr.org/papers/volume15/srivastava14a/srivastava14a.pdf, 1. Introductions pp. 1929-1932.

\* cited by examiner

COMPUTER-IMPLEMENTED METHOD OF ANALYZING AN IMAGE TO SEGMENT ARTICLE OF INTEREST THEREIN

This application is a national phase filing of PCT/CA2020/050758 and claims the benefit of U.S. Provisional application Ser. No. 62/857,123 filed Jun. 4, 2019 and U.S. Provisional application Ser. No. 62/871,483 filed Jul. 8, 2019.

FIELD OF THE INVENTION

The present invention relates generally to a computer-implemented method of analyzing an image to segment an article of interest in the image, and more particularly to such a method including a machine learning algorithm having at least one convolution layer, at least one separate convolution module, a pooling module and a decoder module.

BACKGROUND

In the research on the automated assessments of infrastructures, methods based on implementing computer vision algorithms have been suggested as a potential way to replenish human visual inspections. However, computer vision algorithms are limited because they are highly susceptible to changes in environmental conditions. Moreover, they cannot be implemented in practical field usage due to the incapability of extracting sensitive features [1].

In recent years, convolutional neural networks (CNN) have been implemented instead of computer vision algorithms to overcome these limitations. CNNs are often referred to as deep learning (DL) because they are composed of deep layers of operations, in which the filters of the layers learn features automatically and hierarchically from raw data [2], [3]. Subsequently, extremely fast computations on graphics processing units (GPU) [4] were a breakthrough in DL research, and since then the implementation of GPUs has become standardized. In the last few years, the composition of CNN architectures has been studied [5], [6], [7], [8] to achieve better performance while reducing computational costs. As a result, many researchers have shared their pretrained models, which can be adopted directly in DL tasks (e.g., classification, object detection, and segmentation) using fine-tuning and transfer learning [9].

References [1], [10], [11] explored the potential of DL in structural health monitoring (SHM). The authors showed that DL methods are capable of automatic feature extraction and that this potential could lead to an industrial-level application for classifying each small region of images to crack or back-ground using of a sliding window technique. Subsequently, this approach was combined with an autonomous drone system [12]. However, in these previous methods, damage localization relied on the size of the sliding windows rather than the size of objects. Therefore, flexible localization methods were required, and faster R-CNN [13] was adopted in the SHM research on localizing damage [14], [15], [16]. However, thin, elongated, and atypical features (e.g., cracks) residing across image spaces, especially in diagonal directions, result in obfuscated localization. Therefore, an additional process is required for the quantification (i.e., measuring thickness or length) of the detected cracks. To address the above difficulties and drawbacks, we consider damage detection as pixel level segmentation rather than a problem of classification or object detection.

Figure 1:
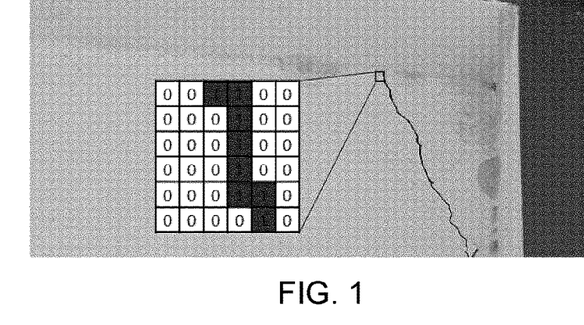
FIG. 1 is a segmentation example.

Object segmentation is a key DL task that aims to obtain the complete understanding of a scene in images. Object segmentation has been successfully implemented in medical image analysis [17], self-driving vehicles [18], and so on. As shown in FIG. 1, segmentation is similar to image classification except each pixel is classified rather than the entire image, in which the binary numbers "1" and "0" as pixel values represent a crack pixel and a background pixel, respectively.

Crack segmentation methods that implement DL have been developed in recent research [19], [20], [21], [22], [23]. However, these previous methods segment cracks only on monotonous backgrounds, and the trained model might not be adapted to find cracks in images with complex backgrounds.

Hence, such applications are valid only if the images include surfaces without complex features or geometry, which is unlikely the case in real applications. A hybrid segmentation method for measuring the volume of concrete spalling with complex backgrounds using the combination of a faster R-CNN and a depth camera was proposed by [24]. However, it has not been successfully applied in crack quantification, because of the low resolution of the applied depth camera. Hence, segmenting cracks in two dimensions (2-D) on digital images remains a critical method.

SUMMARY OF THE INVENTION

According to an aspect of the invention there is provided a computer-implemented method of analyzing an image to segment an article of interest in the image, comprising:

receiving the image having a width of $n_1$ pixels, a height of $n_2$ pixels and a depth of d channels;

processing the image using a machine learning algorithm configured to segment the article of interest, the machine learning algorithm comprising a convolutional neural network including:

at least one convolution layer;

after said at least one convolution layer, at least one separable convolution module comprising a series of separable convolutions, each separable convolution comprising a depthwise convolution and a pointwise convolution;

after said at least one separable convolution module, a pooling module; and         a decoder module after the pooling module;

and displaying the image with location of the article of interest being indicated if determined to be present by the machine learning algorithm.

For example, the channel depth d=3 for a RGB image.

In at least one arrangement, the at least one convolution layer comprises:

a first convolution layer having $f_1$ filters each having a width of $w_1$ pixels, a height of $h_1$ pixels and a depth of $d_1$ channels with a stride of $s_1$; and     after the first convolution layer, a second convolution layer having $f_2$ filters each having a width of $w_2$ pixels, a height of $h_2$ pixels and a depth of $d_2$ channels with a stride of $s_2$;

wherein $f_2 = nf_1$;

wherein $s_2 = ns_1$;

wherein n is an integer.

In the illustrated arrangement, n=2.

In the illustrated arrangement, $f_1 = 32$.

In the illustrated arrangement, $s_1 = 1$.

In at least on arrangement, the at least one separable convolution module comprises:

a first separable convolution module comprising a series of $SC_1$ separable convolutions each with a stride of one except for a last one of said series which has a stride of $s_3$;

after the first separable convolution module, a second separable convolution module comprising a series of $SC_2$ separable convolutions each with a stride of one except for a last one of said series which has a stride of $s_4$;

after the second separable convolution module, a third separable convolution module comprising a series of $SC_3$ separable convolutions each with a stride of one except for a last one of said series which has a stride of $s_5$;

after the third separable convolution module, a fourth separable convolution module comprising a series of $SC_4$ separable convolutions each with a stride of one except for a last one of said series which has a stride of $s_6$;

each depthwise convolution filter having a width of DW pixels, a height of DH pixels and a depth of nd channels; and each pointwise convolution filter having a width of 1 pixel, a height of 1 pixel and a depth of nd channels.

That is, both the depthwise and pointwise convolution filters have the same depth.

In other arrangements, different strides can be used depending on the image to be processed. A stride particularly of a value greater than one reduces computational burden of the algorithm for quicker processing.

In at least one arrangement, each of $s_3$, $s_4$, and $s_5$ are equal to $N_1$ and $s_6$ is equal to $N_2$.

That is, for improved performance, strides $s_3$, $s_4$, and $s_5$ have the same value and $s_6$ is a different value.

In the illustrated arrangement, each of $s_3$, $s_4$, $s_5$ are equal to two (that is, $N_1$32 2) and $s_6$ is equal to one (i.e., $N_2$=1).

In at least one arrangement, the fourth separable convolution module is performed x times, where x is an integer greater than two.

In the illustrated arrangement, x=6.

In at least one arrangement, in each separable convolution of the at least one separable convolution module, the depthwise convolution is performed after the pointwise convolution.

In at least one arrangement, in respect of each separable convolution module, the pointwise convolution of each one of the series of separable convolutions after a first one thereof is performed on a combined feature map formed by concatenating an output feature map of an immediately previous one of the series of separable convolution with an input feature map of each earlier one of the series of separable convolutions.

In at least one arrangement the pooling module comprises:
  an initial pointwise convolution;
  a series of parallel-connected atrous separable convolutions after the initial pointwise convolution, each atrous separable convolution comprising a pointwise convolution and a dilated depthwise convolution after said pointwise convolution; and
  a final pointwise convolution after the series of atrous separable convolutions.

In at least one arrangement the series of atrous separable convolutions comprises:
  a first atrous separable convolution with a dilated depthwise convolution having a dilation rate of $r_1$;
  a second atrous separable convolution with a dilated depthwise convolution having a dilation rate of $r_2$, wherein $r_2=r_1+y$;
  a third atrous separable convolution with a dilated depthwise convolution having a dilation rate of $r_3$, wherein $r_3=r_2+y$; and
  a fourth atrous separable convolution with a dilated depthwise convolution having a dilation rate of $r_4$, wherein $r_4=r_3+y$.

That is, the dilation rate of the dilated depthwise convolution filter of each subsequent atrous separable convolution is related to the dilation rate of the immediately previous atrous separable convolution by a common constant, in this case y.

In the illustrated arrangement, y=1.

In other arrangements, y may be equal to 2 or 3, for example.

In at least one arrangement, the initial and final pointwise convolutions and each atrous separable convolution is followed by a rectified linear unit activation function.

In at least one arrangement, the decoder module is configured to receive as its input an output of the pooling module, an output of a selected one of said at least one convolution layer, and an output of a selected one of said at least one separable convolution module.

In at least one arrangement the decoder module comprises:
  a first separable convolution comprising a pointwise convolution performed on a combined feature map formed by concatenating a first feature map which is formed by up-sampling the output of the pooling module and a second feature map which is formed by performing a pointwise convolution on the output of the selected one of said at least one separable convolution module, followed by a depthwise convolution;
  after the first separable convolution, a second separable convolution comprising a pointwise convolution followed by a depthwise convolution to generate an output of the second separable convolution;
  after the second separable convolution, a tertiary pointwise convolution performed on a combined feature map formed by concatenating a first feature map which is formed by up-sampling the output of the second separable convolution and a second feature map which is formed by performing a pointwise convolution on the output of the selected one of said at least one convolution layer;
  after the tertiary pointwise convolution, an activation function; and
  a loss function after the activation function.

In at least one arrangement, the activation function is a softmax function.

In at least one arrangement, the loss function is a mean intersection-over-union loss function.

In at least one arrangement, each one of the at least one convolution layer includes a final rectified linear unit activation function after which an output of said each one of the at least one convolution layer is generated.

In at least one arrangement, each separable convolution of the at least one separable convolution module is followed by a rectified linear unit activation function.

In at least one arrangement, the pooling module includes an activation function and, for training the convolutional neural network, a dropout layer thereafter.

It is an aspect of the present invention to build a real-time segmentation method via pure deep learning algorithms which is capable of negating a wide range of background features and crack-like patterns.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures illustrate a computer-implemented arrangement for analyzing an image to segment an article of interest in the image.

Semantic Damage Detection Network

Well-known deep learning (DL) models or architectures, such as ResNet [6] and DenseNet [8], were developed to recognize a large number of classes, such as the 1K classes in ImageNet [25]. On the contrary, structural health monitoring (SHM) researchers deal with small numbers of classes. Therefore, we claim that a task- and domain-specific CNN architecture should be independently developed, and there would be a significant improvement in computational efficiency without performance deterioration. For these reasons, an original CNN network, which is a semantic damage detection network (SDDNet) that was inspired by a DenseNet and DeepLabV3+ [26], is proposed for the specific purpose of SHM.

Figure 2:
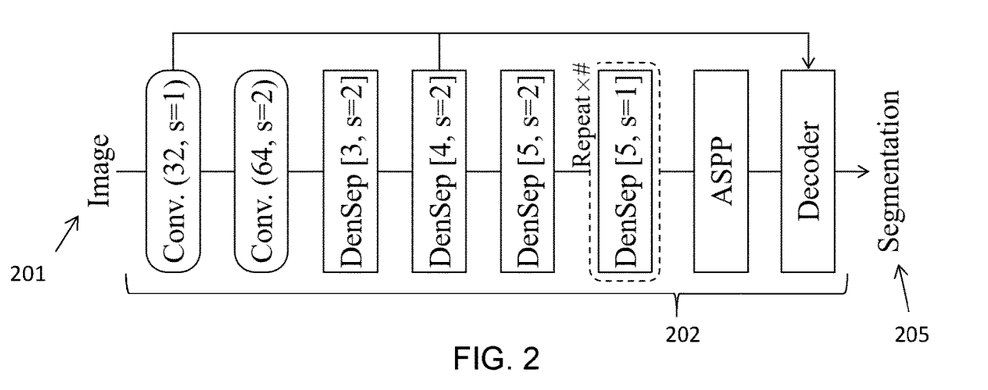
FIG. 2 is a schematic diagram of an architecture of machine learning algorithm according to an arrangement of the present invention, which for convenient reference is referred to herein as SDDNet.

The proposed new CNN architecture is an encoder-decoder [27] composition. FIG. 2 depicts the schematic architecture of SDDNet, where all the operations before the Decoder module functions as the encoder. In the figure, the first two operations are standard convolutions ("Conv" in FIG. 2), and the rest are newly developed or modified modules. The DenSep modules are composed of separable convolutions [28], each of which is the successive operation of a point-wise (PW) and a depth-wise (DW) convolution. Each standard convolution involves a single operation, while each module involves several operations. Therefore, the parentheses and brackets shown in FIG. 2 represent different contents. The first values in the parentheses in addition to the standard convolutions are the number of filters. The first values in the brackets indicate the number of separable convolutions that are involved in the corresponding modules. The second values in both the parentheses and brackets are the output stride ("s" in FIG. 2) of each operation or module, in which "s=2" implies that the filters shift two pixels in the calculation.

Applying the output stride of 2 four times from the second "Conv. (64, s=2)" layer to "DenSep [5, s=2]," as shown in FIG. 2, results in reducing the spatial dimension by $\frac{1}{16}$. Reducing dimensions is essential in any DL task to ensure computational efficiency and save GPU memory. Then SDDNet simply repeats the DenSep module several times with the output stride of 1 to extract high-level features before multiscale-feature extraction by atrous spatial pyramid pooling (ASPP), which was modified from the original ASPP [26]. The spatial dimension of multiscale features is much smaller than that of the input image. Hence, the Decoder module was designed for restoring the spatial dimension by the concatenation of low-level features at the end of the proposed network.

In this disclosure, the filter sizes of all PW convolutions are 1×1 and otherwise 3×3. The batch normalization [29] layers follow all the convolution operations. The standard and DW convolutions involve zero paddings to retain the dimensions of the feature map (i.e., outputs of convolutions). Regarding the activation function, the rectified linear unit (ReLU) [30] is commonly used. The two standard convolutions at the beginning of the proposed network are followed by ReLUs, and each of the DenSep, ASPP and Decoder modules also have ReLUs. Several shortcuts exist in the SDDNet, which resemble those in the DenseNet architecture [8]. The detailed procedures of each operation can be found in [31].

A. DenSep Module

Figure 3:
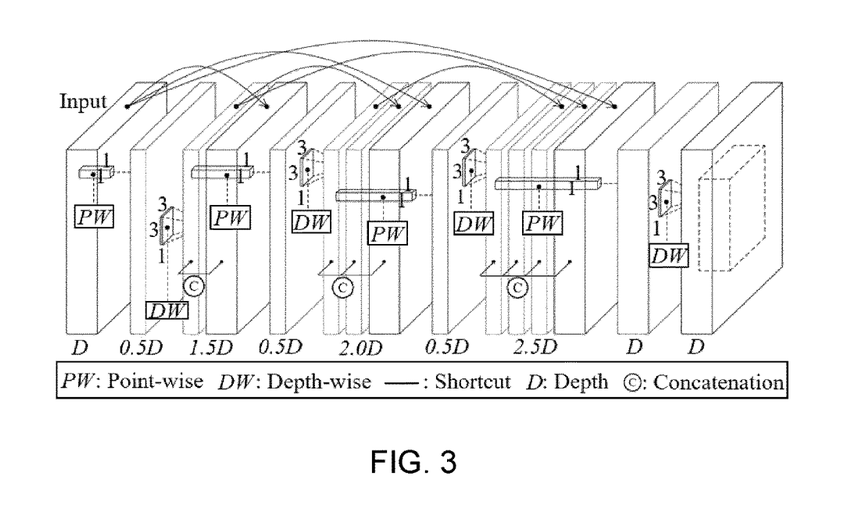
FIG. 3 is a diagram of a DenSep module comprising four separable convolutions.

The DenSep module, which involves separable convolutions, is the core of the SDDNet. An example of the DenSep module with four separable convolutions is depicted in FIG. 3. In separable convolutions, calculations are performed much faster compared to the standard convolution by sequentially applying DW and PW filters [7], [28], and [26]. However, all separable convolutions in SDDNet, including the DenSep, ASPP, and Decoder modules, are applied in reverse order to achieve even faster calculations as shown in FIG. 3. All the PW convolutions function in reducing the depth of the inputs to dramatically reduce the computational cost [6]. The outputs of each separable convolution are designed to concatenate to all the input feature maps of later separable convolutions within each DenSep module. The last separable convolutions in the first three DenSep modules are selectively accompanied by the stride of 2 to reduce the spatial dimensions of the feature maps by $\frac{1}{16}$. For simplicity, ReLUs are not shown in the figure, but they are applied after all the DW filters.

Figure 4:
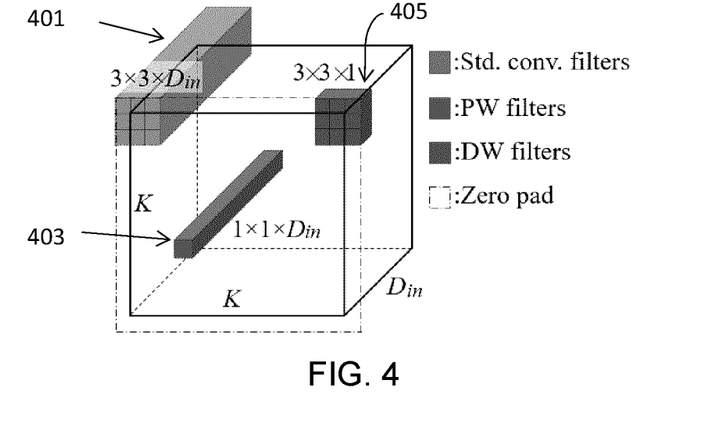
FIG. 4 illustrates a comparison of convolution operations.

The comparison of standard, PW, and DW convolutions is shown in FIG. 4. In FIG. 4, standard convolution is indicated at 401, PW convolution at 403, and DW convolution at 405. Note that the 1×1 convolution is technically equal to the PW convolution of a separable convolution. All the convolution operations involve multiplications, and the number of multiplications can be considered the number of computations. The computational cost of each operation that is applied to the feature map having $K \times K \times D_{in}$ dimensions can be calculated by (1) to (3) for standard, PW, and DW convolutions, respectively. Note that $D_{in}$ and $D_{out}$ in the equations indicate the input and output depth sizes of the feature map, respectively. Separable convolution in its reverse order, which is utilized in this disclosure, is defined by the successive operations of PW and DW convolution. Therefore, the computational cost of a separable convolution can be obtained by summing (2) and (3).

$$9 \times K^2 \times D_{in} \times D_{out} \quad (1)$$

$$K^2 \times D_{in} \times D_{out} \quad (2)$$

$$9 \times K^2 \times D_{out} \quad (3)$$

Based on the above equations, the number of multiplications associated with the DenSep module and a module with standard convolutions is calculated as shown in Table 1.

Comparing the sum of the multiplications of the modules, the DenSep module reduces approximately 70% of the computational cost compared with the standard convolution module. For example, if the size of the D is 32, the number of calculations is reduced to approximately 30% (i.e., 235=6.5D+27 and 784=24.5D (Table 1)).

B. Atrous Spatial Pyramid Pooling Module

Figure 5A:
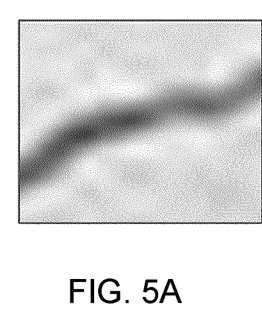
FIGS. 5A through 5C show, respectively, a real crack, an image containing the real crack and a crack-like feature like that shown in FIG. 5C.
Figure 5B:
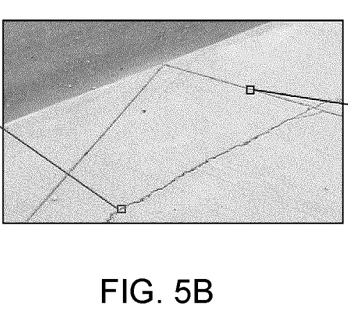
Figure 5C:
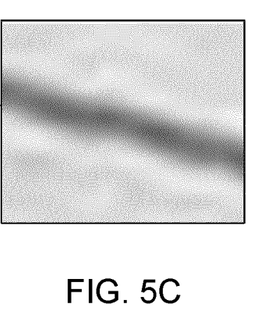

If a CNN model of segmentation is designed to deal with objects that have irregular shapes (e.g., cracks), the CNN model may require a wide field of view (FOV) rather than focusing only on a small region. The reason is that such objects likely have a small number of features, which leads to the need to gather peripheral information to ensure correct classifications. For example, as shown in FIGS. 5A-5C, the features in each magnified region (i.e., a small FOV) cannot be clearly classified as cracks (FIG. 5A) or crack-like features (FIG. 5C) without the surrounding information of the original image (FIG. 5B). One way to collect the surrounding information is to increase the size of the filters, which however inevitably leads to an exponential increase in the computational cost. To deal with this drawback, a modified atrous spatial pyramid pooling (ASPP) module is adopted in the SDDNet. The original ASPP was proposed in DeepLabV3+.

Figure 6:
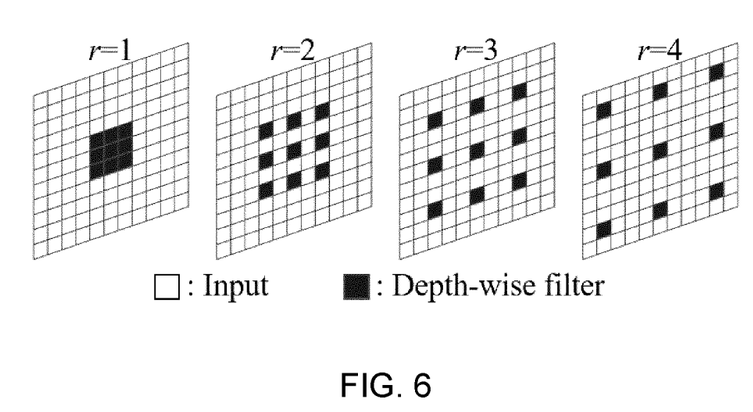
FIG. 6 illustrates a dilated depth-wise convolution.

The original ASPP is composed of global average pooling (GAP), PW convolution, and three atrous separable convolutions (ASC) in the standard order (i.e., DW is followed by PW), where the only difference from separable convolution is the use of a dilated DW filter (see FIG. 6). In this disclosure, the original ASPP is modified as follows: the PW convolution is kept, ASC is modified from the standard order to inverse order to reduce the computational cost, and GAP is removed because it strongly regularizes networks, whereas the SDDNet has a considerably small number of parameters that result in performance deterioration. The dilated DW filters [32] are shown in FIG. 6, where the dilation rate (denoted as "r") implies the number of skips to the neighboring elements of a filter. The ASC with the larger dilation rate can be interpreted as the filters capturing features through a larger FOV while keeping the number of parameters of the filters.

Figure 7:
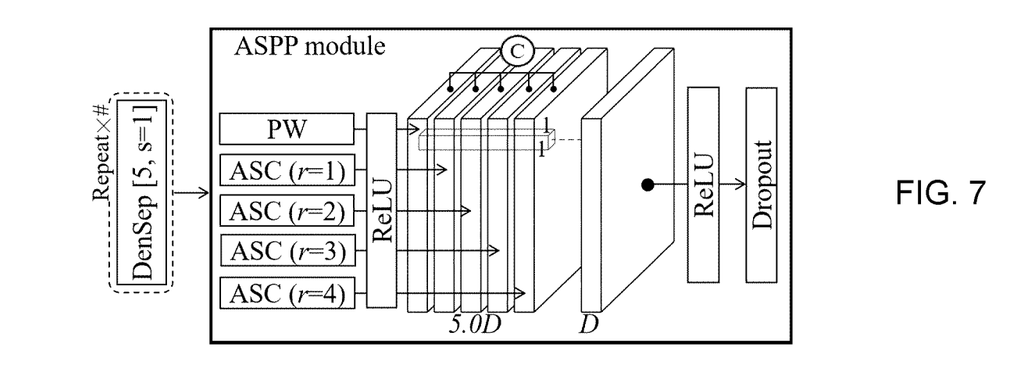
FIG. 7 illustrates a modified atrous spatial pyramid pooling (ASPP) module.

As shown in FIG. 7, the modified ASPP module simply concatenates ("©") each output of the PWs and ASCs, and it applies PW convolution to represent the concatenated feature map. Hence, the concatenation of ASCs at various dilation rates extracts multiscale features without the additional computation of large FOVs. All dilated DW convolutions in the ASPP module consist of 3 3 filters, which have the dilation rates of 1 to 4, respectively. To prevent overfitting, dropout [33] is used at the end of the ASPP module in training. Regarding ReLU, all the ASCs and PWs are followed by ReLUs.

C. Decoder Module

Figure 8:
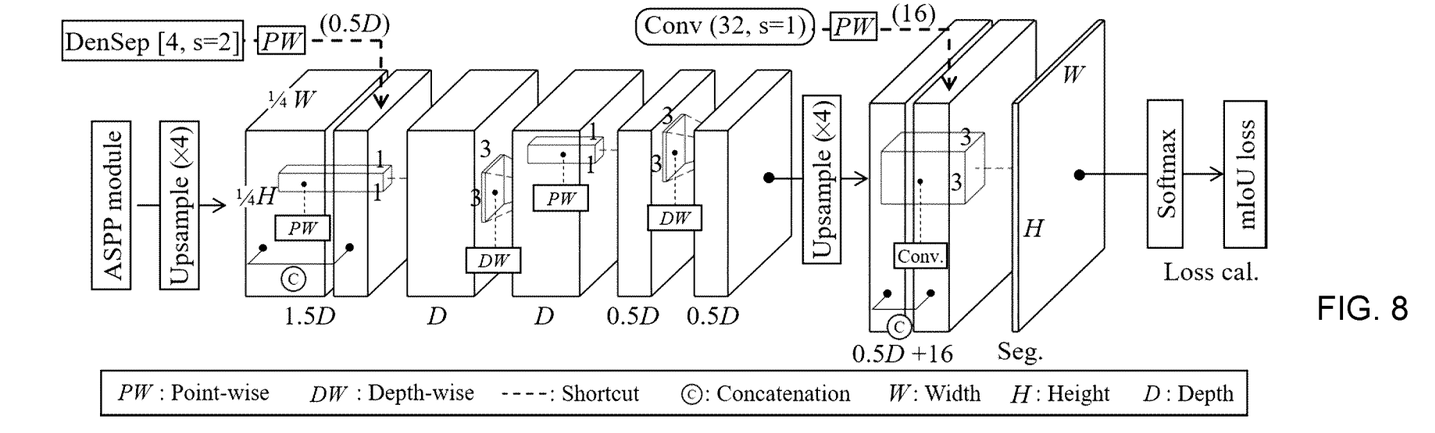
FIG. 8 illustrates a decoder module.

The Decoder module is designed to generate fine-grained segmentation. The module involves two-step restorations, as shown in FIG. 8. In the first step, the input feature map of the Decoder module, in which the spatial dimension is 1/16 of the input images, is up-sampled by the scale factor of "4." It is concatenated with the low-level feature map from the second DenSep module (see FIGS. 2 and 8). The concatenated feature map is now passed through two separate convolutions and then up-sampled again by the scale factor of "4." Thereafter, the feature map is concatenated with another low-level feature map from the first standard convolution (see FIGS. 2 and 8), which has the same spatial dimensions as the input image. Finally, a 3×3 convolution is applied to the last concatenated feature map to generate the segmentation ("Seg." in FIG. 8) results. In this module, ReLUs are used after all PW and DW convolutions. The mean intersection-over-union (mIoU) loss after the softmax function is used to compute loss ("Loss cal." in FIG. 8) and backpropagate [3] the errors in training.

D. Model Customization

The SDDNet can be customized by setting different depth values (D) and the number of repetitions of the DenSep modul. Hereafter, each customized model is denoted by SDD-R#D#, where R# and D# indicate the number of repetitions of DenSep module and the D value, respectively. The SDD-R6D64 was considered as our final model, but the SDD-R6D32 is also discussed herein. Note that the number of PW filters in the DenSep module with six repetitions was set at D instead of 0.5D (see FIG. 3) for the customized models reported in this disclosure.

Dataset Generation

The proposed SDDNet is trained using supervised learning, which requires several data to be fed into the model. However, no public dataset suited our specific purpose. Hence, a dataset was created manually. The dataset consists of 200 digital images with various pixel resolutions. The images were collected from either the Internet or taken manually: 55 images were manually taken using smartphones. 104 images were collected from Datacenterhub [34]. 41 images were downloaded from Google image. Accordingly, each image was taken under different conditions (e.g., various distance, light intensity, FOV, and image quality). The spatial dimensions of the images in any axes are between 513 and 1920 pixels. The minimum size of the images is 513×513, and the maximum size of the images is approximately the size of high definition images (i.e., 1920× 1080).

The ground truth of each image was obtained by manually selecting pixels that belonged to cracks, in which the selected pixels were labeled 1 (crack), and otherwise 0 (background). Image labeling was conducted using Affinity Photo (https://affinity.serif.com/en-gb/photo), a commercial photo editing application. Consequently, the total number of pixels labeled as 1 was about 260 times less than the number of pixels labeled 0 (examples of the images are shown later with the corresponding results), and any CNN model likely faces the challenge of being optimized. The dataset was divided into two subsets: 160 images for training and 40 images for testing. The cracks labeled in our dataset could be categorized according to the characteristics of crack features as follows:

Thick crack: a crack with a thickness of 5 or more pixels.
Thin crack: a crack with a thickness of 1 to 4 pixels.
Blurry crack: either a thick (i.e., thick-blurry) or thin (i.e., thin-blurry) crack with blurry features, which are still well-recognizable.

Faint crack: a crack that is not recognizable without careful observations.

Crack-like feature: a feature which resembles a crack without peripheral information.

However, more detailed characteristics, such as number of cracks and the measure of faintness were not calculated because there were no existing methods of calculating them. Sample labels are shown in the following link: "https://github.com/choiw-public/SDDNet." Hereafter, the created dataset is referred to as the Crack200 dataset.

Training Details

In regard to training of SDD-R6D64, first, the model was pretrained on the Cityscape dataset [35] after some modifications, followed by additional training on the Crack200 dataset. The SDDNet was coded in the Python programming language using the Tensorflow deep learning framework [36]. The SDDNet was deployed to a workstation, and the technical specifications were as follows:

CPU: Intel Core i7-6850K
GPU: Nvidia Geforce Titan Xp×4ea
RAM: 128GB

Note that the above GPUs were used only in training the SDDNet models. In testing, we used an old GPU, Nvidia Titan X, to highlight the real-time performance.

A. Training Strategy

The input size was set to 513×513 pixels, which were randomly cropped from the raw training images. This specific cropping size was chosen for the following reasons: we experimentally found that sizes larger than the ¼ cropping size of all the original images gave the best results. The reason is most likely that the cropped images contained enough contextual information. In addition, the odd number 513 was arithmetically beneficial when convolutions with strides were applied. When the model was converged, it was further trained on a larger input size. This additional training was configured to tune the dilated DW filters in the ASPP module; thereby, in testing the trained model was better on large images. When the training was completed, the trained model could accept any image size because the proposed architecture follows a fully convolutional manner [37]. The training strategy explained here was applied in both pretraining on the modified Cityscape dataset and fine-tuning on the Crack200 dataset.

B. Loss Function and Hyperparameters

To train our models, we used mIoU loss, which was a modification of IoU loss [38]. The mIoU loss was calculated by (4) in a batch size of "n" with a "C" number of classes. In the equation, "I(x, y)" and "U (x, y)" indicate the sums of the approximated intersection and union, where "x" is the set of probabilities derived from the softmax function, and "y" is the set of one-hot-encoded true labels. The mIoU score, which is the most frequently used in segmentation tasks, can be calculated by disregarding the "1−" term and substituting "x" for one-hot-encoded prediction from (4).

$$1 - \frac{1}{C} \frac{\sum_{i=1}^{n} I_i(x, y)}{\sum_{i=1}^{n} U_i(x, y)} \quad (4)$$

Regarding the model optimization, the Adam optimizer [39] was used. Momentum, dropout rate, and weight decay were commonly set at 0.9, 0.5, and 0.00004 for training on both datasets, respectively. We scheduled the learning rates at each training iteration ("iter.") based on the cyclical learning rate policy [40] calculated by (5), where "X" is defined by (6). We empirically set "γ" at 0.99996. Other hyperameters including "lr1," "lr2," and "step" are listed in Table 2.

$$lr_2 + (lr_1 - lr_2) \times \max(0, 1 - X) \times \gamma^{iter.} \quad (5)$$

$$X = \left| \frac{iter.}{step} - 2 \times \left\lfloor \frac{1 - iter.}{2 \times step} \right\rfloor + 1 \right| \quad (6)$$

C. Pretraining on the Cityscape dataset

Figure 9:
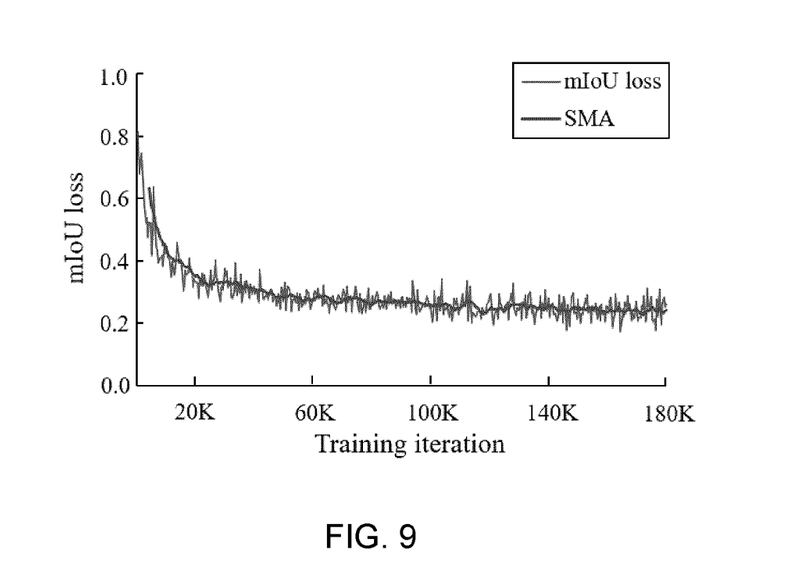
FIG. 9 is a graph of mean intersection-over-union (mIoU) loss over training iteration.

Pretraining is a popular method because it is an effective initialization method, especially in training on a relatively small dataset [9]. Prior to training the SDD-R6D64 on the Crack200 dataset, we pretrained the model on a modified Cityscape dataset. The Cityscape dataset originally consisted of images of 30 different types of objects in 3,475 images that were taken in various cities. We chose this dataset to verify the trainability of our model on a multi-class dataset. In addition, we considered that the image features in the Cityscape dataset resembled those in our dataset. However, the proposed model is intended to deal effectively with a few classes. Therefore, we modified the original dataset by combining similar objects in the same class and converting the labels of some objects to zeros (i.e., the background). The modified Cityscape dataset is shown in Table 3. The SDD-R6D64 was pretrained on the modified Cityscape dataset for roughly two days, and the loss graph is given in FIG. 9. In the pretraining, the input size was changed from 513×513 to 1009×1009 at the 100K-th iteration, and it was further trained until 180K-th iteration. The pretrained models had different weights at each iteration, and there was no clear standard to define which model would be best for fine-tuning on the Crack200. We considered the models within a period of convergence to have similar contributions to fine-tuning on the Crack200. Considering the batch size of 8 and input dimension of 1009×1009, about 40K iterations were enough to feed all the images of the modified Cityscape dataset into our model. The simple-moving-average (SMA in FIG. 9) of mIoU loss was therefore calculated with the period of 40K iterations, as shown in FIG. 9. The models between 140K and 180K had an SMA of 0.240±0.006, and we randomly chose one of the models within the period of convergence as a pretrained model. All the pretrained filters, except the last PW filters in the Decoder module, were used as the initial filters in training our model on the Crack200 dataset. This technique is known as fine-tuning [9].

Results and Experimental Evaluations

The SDD-R6D64 was trained on the Crack200 dataset in addition to the training procedures. The trained model was tested on the Crack200's test set. The corresponding evaluation metrics and visualizations are reported hereinafter.

A. Learning Profiles in the Test Set

Figure 10:
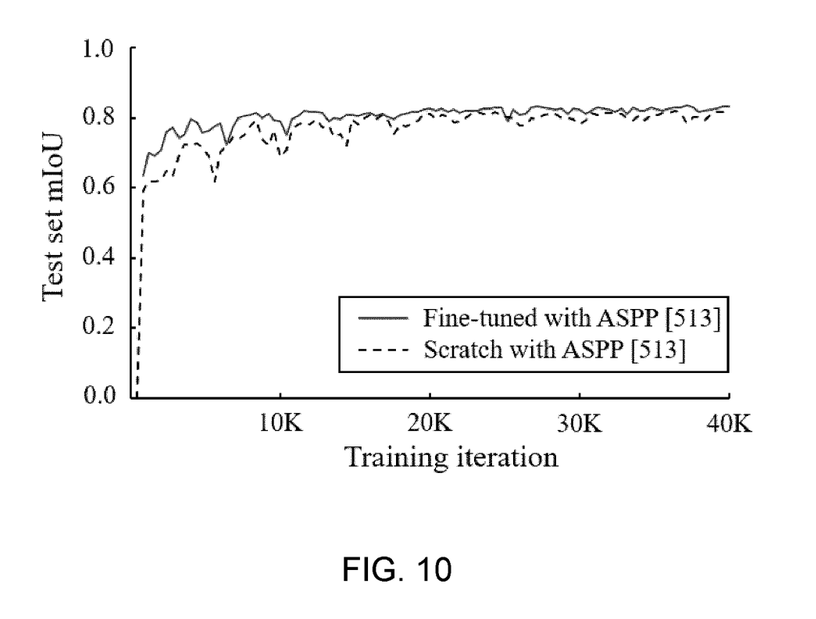
FIG. 10 is a graph of comparative profiles of SDD-R6D64 using two different training approaches.

In this subsection, the segmentation results of the Crack200's test set are compared with different training strategies, and the corresponding discussion is provided. A loss graph over the training iterations is omitted here because the profiles from the test set included the information in the loss graph. The total duration of training on the Crack200 dataset was approximately six hours. FIG. 10 shows the effects of the pretraining on the modified Cityscape dataset. In the figure, the numbers in brackets indicate the sizes of the input images in training. "Fine-tuned" implies that the model was initialized using the filters in the pretrained model and then trained on the Crack dataset.

"Scratch" indicates that the model was directly trained on the Crack dataset without the adoption of a pretrained model. As the figure shows, the fine-tuned model outperformed the model trained from scratch over all training iterations.

We considered that the fine-tuning process was almost converged at 40K-th iteration with the mIoU of about 0.8 as shown in FIG. 10, and paused fine-tuning. After then, the input size was changed from 513×513 pixels to 1009×1009 pixels and resumed fine-tuning until 50K-th iteration. Consequently, slightly better mIoU of 0.846 were obtained as listed in Table 4, in which Precision (Pre.), recall (Re.), and F1 score are calculated by Equations (7) to (9). In this Table, the summarized results of "Fine-tuned without ASPP" are also provided to check the effectiveness of the modified ASPP module.

As Table 4 shows, the fine-tuned SDD-R6D64 with the modified ASPP module obtained the best overall results. Therefore, the model that achieved the mIoU of 0.846 was considered our final model.

$$Precision = \frac{True\ positive}{True\ positive + False\ positive} \quad (7)$$

$$Recall = \frac{True\ positive}{True\ positive + False\ negative} \quad (8)$$

$$F1\ score = \frac{2 \times Precision \times Recall}{Precision + Recall} \quad (9)$$

B. Segmentation Results

In this subsection, representative segmentation results are presented with comprehensive visualizations. The images shown in the figures follow the demonstration rule: the raw images and the images showing segmentation results are denoted as "Raw" and "Seg.," respectively. In the segmentation results, true positive (TP), false negative (FN), and false positive (FP) pixels are colored red, green, and blue, respectively. The combination of TP and FN pixels are interpreted as ground truths, and that of TP and FP are the pixels predicted as crack pixels by the trained model. The caption of each figure includes the corresponding mIoU values, and the size of the image is also provided in brackets beside the mIoU values. In the figures, some regions in the segmentation images are congested where the crack features are much smaller than the images, and several cracks are barely noticeable. Hence, each region is marked as a region-of-interest (ROI) and enlarged to present as fully as possible the characteristics of the proposed model.

Figure 11A:
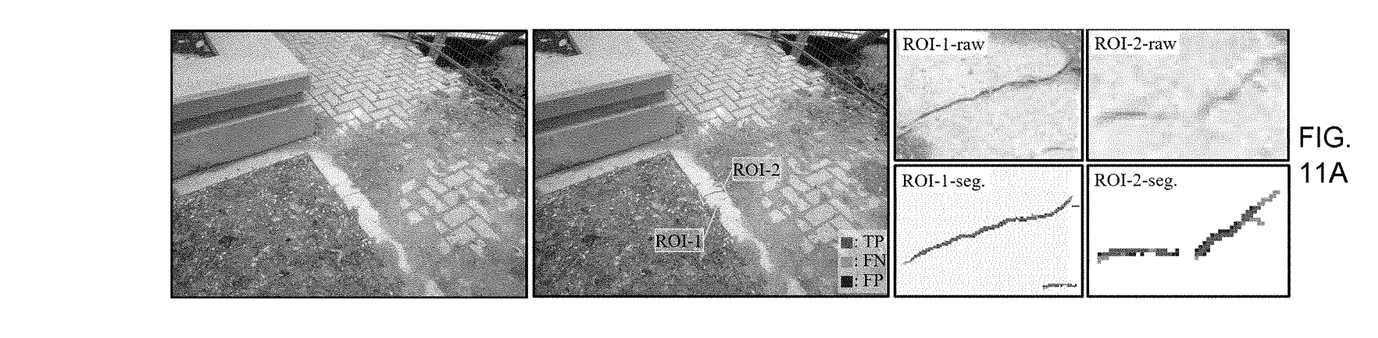
FIGS. 11A through 11C show segmentation results of SDD-R6D64 and more specifically mIoU=0.830 [1920×1440]; mIoU=0.909 [1280×720]; and mIoU=0.898 [1276×1920], respectively.
Figure 11B:
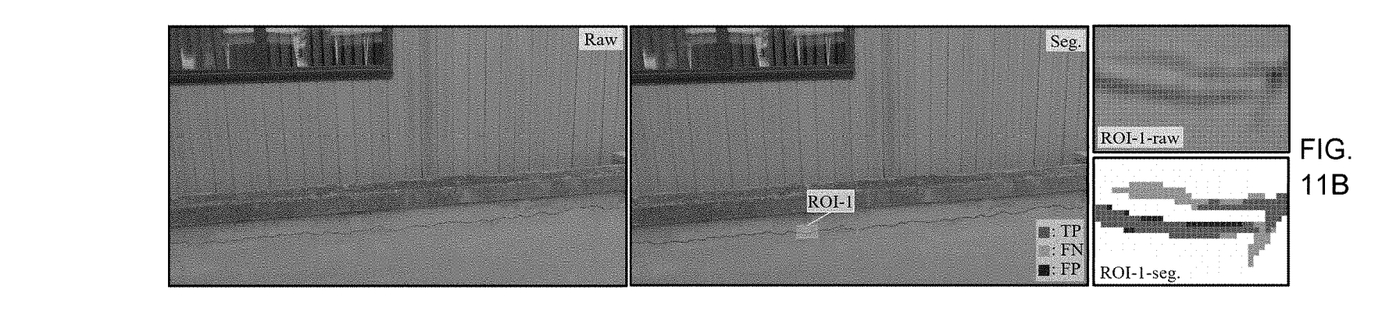
Figure 11C:
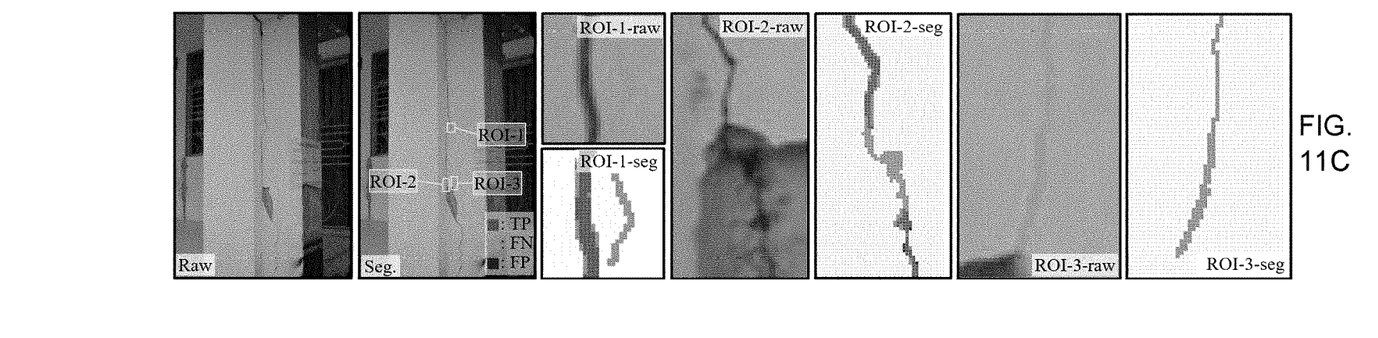

FIGS. 11A through 11C show the segmentation results of the SDD-R6D64. The trained model successfully negated background features and detected cracks even when the tested figures contained complex crack-like features such as those shown in FIG. 11A. In addition, the SDD-R6D64 showed the capability in segmenting very fine cracks lying on a few pixels. The common failures were observed as follows: 1) the most FN predictions were on the edges of TP pixels, but we consider such false predictions are allowable because the definitive edges of cracks cannot be obtained especially in fine cracks; 2) Faint cracks, such as those shown in FIG. 11B in portion ROI-1 thereof, FIG. 11C in portion ROI-1 thereof, and FIG. 11C in portion ROI-3 thereof, were not properly segmented (see FN pixels); 3) the cracks residing in spalling regions, as shown in FIG. 11C in portion ROI-2 thereof, were also not properly segmented (see FN pixels). Further test results are available at the following link: "https://github.com/choiw-public/SDDNet".

C. Comparative Studies and Discussions

It was previously stated that: 1) building a domain- and task-specific model is much beneficial; 2) training a model on images of monotonous backgrounds is not a proper approach.

Figure 12:
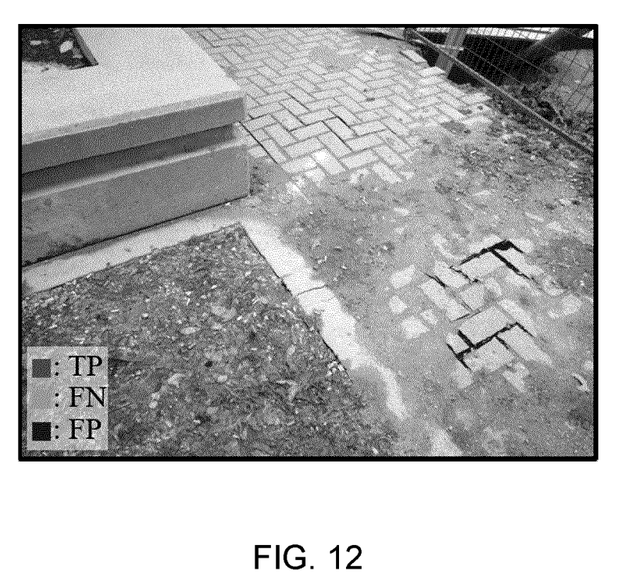
FIG. 12 shows segmentation result of SDD-R6D64 trained on images of monotonous background.

In regard to item 1) above, we compared the SDDNet with DeepCrack [41], which is one of the latest CNN for crack segmentation. The authors of [41] reported the performances of six customized DeepCrack models and compared with other segmentation models. The results showed that DeepCrack models outperformed the other segmentation models, and each DeepCrack model had different merits at precision, recall, F1, and mIoU. Among the DeepCrack models, the top three were compared with a customized SDDNet model. The details of each customized DeepCrack model are provided in [41]. To further highlight the superiority of the SDDNet, we customized our model, the SDD-R6D32, to have a much smaller number of parameters than either the DeepCrack models or our final model (the SDD-R6D64). Note that the cores of the DeepCrack models were composed of VGG-16's layers [5], and VGG-16 was developed to classify images into 1K classes. The total number of parameters (i.e., weights) in the DeepCrack models was 14 million (M), while the SDD-R6D32 had only 0.160 M parameters This was approximately 88 times smaller than that of the DeepCrack models. To ensure fair comparisons, the following were considered: 1) we used DeepCrack's train and test sets in training and testing, respectively; 2) the SDD-R6D32 was not pretrained because DeepCrack models were not pretrained. Because of the large number of parameters, the DeepCrack models were expected to show better results, but the SDD-R6D32 showed slightly better results in all aspects as shown in Table 5. Regarding processing time, the DeepCrack-Aug processed an image of 544×384 in 109 ms (9.174 FPS). While the SDD-R6D32 processed the same size of images in 13.54 ms (75.816 FPS), and it was at least 8 times faster than all DeepCrack models. To support the second claim, we individually trained the SDD-R6D64 on the DeepCrack and Crack200 datasets. The comparison results are shown in Table 6. Although the number of parameters of the SDD-R6D64 models was three times greater than that of the SDD-R6D32 (see Table 5), this was still 26 times fewer than that of the DeepCrack models. Moreover, as shown in Table 6, the SDD-R6D64 also returned slightly better evaluation metrics (set of scores denoted by "a" in Table 6) than any of the DeepCrack models (see Table 5). Note that the processing time of the SDD-R6D64 was recorded at 66.628 FPS, which was still at least 7 times faster than all DeepCrack models. The model (SDD-R6D64) which was trained on DeepCrack's training set (i.e., monotonous backgrounds) returned worse results (set of scores denoted by "b" in Table 6) for testing the images of complex background (i.e., Crack200's test set), while the models trained on Crack200's training set recorded consistent metrics (set of scores denoted by "c" and "d" in Table 6) in both testing sets of the Crack200 and DeepCrack. These results indicated that training a model on images of monotonous backgrounds is unlikely valid in real practice. In addition, the SDD-R6D64 trained only on Crack200's training set also returned better results (set of scores denoted by "c") than all the DeepCrack models in Table 5 although none of DeepCrack's training images were used. The significant decrease in the precision scores from "0.874a" to "0.231b" revealed that the model trained on images of monotonous background resulted in extremely high FP predictions (see Equation (7)). This result was a clear indication of susceptibility in negating crack-like features and complex backgrounds using a model trained on images of monotonous background. In contrast, the model trained on the Crack200, retained high precision scores (0.875c and 0.805d), which implied that our final model effectively negated crack-like features and complex backgrounds. An intuitive test result of the above observations is presented in FIG. 12, which contrasts the results shown in FIG. 11A.

To verify our model's real-time performance on large images, three different sizes of images (1920'1080, 1025×512, and 720×480) were tested, as shown in Table 7. As this Table shows, the proposed model processed HD images in 80.40 ms (12 FPS). In addition, the images smaller than 1025×512 pixels were processed in real time, which is a remarkable improvement compared to the results of previous works. For example, [21] proposed the original CNN network, CrackNet-II, and this model processed images of 1025×512 pixels in 1260 ms. However, our final model processed the same size of images in 27.50 ms (36 FPS), which was 46 times faster than in CrackNet-II. Despite the merits of SDDNet discussed herein, the model performance was affected due to poor quality of crack features (incapability of segmenting faint cracks). Hence, certain applications (e.g., asphalt and railway inspections in real time) may require a camera that can capture fine features at high speeds, which, however, is a common challenge in any deep learning models used to segment objects. In addition to the performances of SDDNet, our model shows the potential for effective use in real practice. One major concern in deploying a model to practical devices, such as drones, wearable devices, etc., is storage. The SDD-R6D64 required less than 3 megabytes (MB), which would be bene-ficial in configuring hardware, reducing physical dimensions, and lowering technical requirements as well as cost savings in building SHM equipment.

Conclusion

In this disclosure, the new deep learning architecture, the SDDNet-V1, was proposed for the real-time segmentation of superficial cracks in structures. The SDDNet was composed of standard convolutions, several DenSep modules, a modified ASPP module, and a decoder module. One of the aspects of this disclosure was to segment cracks in images of a wide range of background features. However, no public dataset coincided with this aspect at the time of research. Hence, the Crack200 dataset was manually created. The SDDNet was pretrained on the modified Cityscape dataset and then trained on the Crack200 dataset to improve its performance. The trained model was tested on the test set of the Crack200 dataset, and several images of the results were presented and discussed. This disclosure was conducted to evaluate the proposed model's performance by comparing it with recent models. The results showed that building a domain- and task-specific model would be beneficial and that training a model on images of monotonous backgrounds would not be valid in real practice. The proposed model is expected to be one of the best options in crack segmentation based on the following results:

The SDDNet was able to effectively negate complex backgrounds and crack-like features.

The SDDNet successfully segmented cracks unless the crack features were too faint.

Accordingly, the SDDNet recorded a mIoU of 0.846 and an F1 score of 0.819.

The SDDNet showed better performance in all aspects compared to recent developments even though the model size was 88 times smaller than the compared models.

The SDDNet showed real-time performance (36 FPS) on images of 1025 512 pixels, which was 46 times faster than that in a recent development.

The SDDNet required less than 3 MB of storage in a device, which could lead to flexible choices in configuring hardware.

The common challenge for the susceptibility to image quality was not addressed in this disclosure because it is related to a camera's specifications than a deep learning model.

In this disclosure, cracks were selected as the objects or article of interest to be segmented because they are the one of most common types of damage in civil infrastructures. Compared with other types of damage, it is harder to obtain finely grained features because cracks have subtle features that are often not visible to the naked eye.

As described hereinbefore the present invention relates to a computer-implemented method of analyzing an image to segment an article of interest in the image, such as a crack in a concrete surface, which comprises the steps of:

receiving the image having a width of $n_1$ pixels, a height of $n_2$ pixels and a depth of d channels, as represented by 201 in FIG. 2;

processing the image using a machine learning algorithm configured to segment the article of interest, the machine learning algorithm which is indicated at 202 in FIG. 2 comprising a convolutional neural network including:

at least one convolution layer;

after said at least one convolution layer, at least one separable convolution module comprising a series of separable convolutions, each separable convolution comprising a depthwise convolution and a pointwise convolution;

after said at least one separable convolution module, a pooling module; and a decoder module after the pooling module; and displaying the image with location of the article of interest being indicated if determined to be present by the machine learning algorithm, as represented by 205 in FIG. 2.

For example, the channel depth d=3 for a RGB image.

Referring to FIG. 2, in the illustrated arrangement, the at least one convolution layer comprises:

a first convolution layer having $f_1$ filters each having a width of $w_1$ pixels, a height of $h_1$ pixels and a depth of $d_1$ channels with a stride of $s_1$; and after the first convolution layer, a second convolution layer having $f_2$ filters each having a width of $w_2$ pixels, a height of $h_2$ pixels and a depth of $d_2$ channels with a stride of $s_2$;

wherein $f_2 = nf_1$;

wherein $s_2 = ns_1$;

wherein n is an integer.

In the illustrated arrangement, n=2, $f_1=32$, and $s_1=1$.

Referring to FIG. 3, in the illustrated arrangement, the at least one separable convolution module comprises:

a first separable convolution module comprising a series of $SC_1$ separable convolutions each with a stride of one except for a last one of said series which has a stride of $s_3$;

after the first separable convolution module, a second separable convolution module comprising a series of $SC_2$ separable convolutions each with a stride of one except for a last one of said series which has a stride of $s_4$;

after the second separable convolution module, a third separable convolution module comprising a series of $SC_3$ separable convolutions each with a stride of one except for a last one of said series which has a stride of $s_5$;

after the third separable convolution module, a fourth separable convolution module comprising a series of $SC_4$ separable convolutions each with a stride of one except for a last one of said series which has a stride of $s_6$;

each depthwise convolution filter having a width of DW pixels, a height of DH pixels and a depth of nd channels; and each pointwise convolution filter having a width of 1 pixel, a height of 1 pixel and a depth of nd channels.

That is, both the depthwise and pointwise convolution filters have the same depth.

In other arrangements, different strides can be used depending on the image to be processed. A stride particularly of a value greater than one reduces computational burden of the algorithm for quicker processing.

In the illustrated arrangement, each of $s_3$, $s_4$, and $s_5$ are equal to $N_1$ and $s_6$ is equal to $N_2$. That is, for improved performance, strides $s_3$, $s_4$, and $s_5$ have the same value and $s_6$ is a different value. In the illustrated arrangement, each of $s_3$, $s_4$, $s_5$ are equal to two (that is, $N_1=2$) and $s_6$ is equal to one (i.e., $N_2=1$).

In the illustrated arrangement, the fourth separable convolution module is performed x times, where x is an integer greater than two. In the illustrated arrangement, x=6.

In the illustrated arrangement, in each separable convolution of the at least one separable convolution module, the depthwise convolution is performed after the pointwise convolution.

In the illustrated arrangement, in respect of each separable convolution module, the pointwise convolution of each one of the series of separable convolutions after a first one thereof is performed on a combined feature map formed by concatenating an output feature map of an immediately previous one of the series of separable convolution with an input feature map of each earlier one of the series of separable convolutions.

Referring to FIG. 7, in the illustrated arrangement the pooling module comprises: an initial pointwise convolution;

a series of parallel-connected atrous separable convolutions after the initial pointwise convolution, each atrous separable convolution comprising a pointwise convolution and a dilated depthwise convolution after said pointwise convolution; and a final pointwise convolution after the series of atrous separable convolutions.

In the illustrated arrangement the series of atrous separable convolutions comprises:

a first atrous separable convolution with a dilated depthwise convolution having a dilation rate of $r_1$;

a second atrous separable convolution with a dilated depthwise convolution having a dilation rate of $r_2$, wherein $r_2=r_1+y$;

a third atrous separable convolution with a dilated depthwise convolution having a dilation rate of $r_3$, wherein $r_3=r_2+y$; and a fourth atrous separable convolution with a dilated depthwise convolution having a dilation rate of $r_4$, wherein $r_4=r_3+y$.

That is, the dilation rate of the dilated depthwise convolution filter of each subsequent atrous separable convolution is related to the dilation rate of the immediately previous atrous separable convolution by a common constant, in this case y. In the illustrated arrangement, y=1. In other arrangements, y may be equal to 2 or 3, for example.

In the illustrated arrangement, the initial and final pointwise convolutions and each atrous separable convolution is followed by a rectified linear unit activation function.

Referring to FIG. 8, in the illustrated arrangement, the decoder module is configured to receive as its input an output of the pooling module, an output of a selected one of said at least one convolution layer, and an output of a selected one of said at least one separable convolution module.

In the illustrated arrangement the decoder module comprises:

a first separable convolution comprising a pointwise convolution performed on a combined feature map formed by concatenating a first feature map which is formed by up-sampling the output of the pooling module and a second feature map which is formed by performing a pointwise convolution on the output of the selected one of said at least one separable convolution module, followed by a depthwise convolution;

after the first separable convolution, a second separable convolution comprising a pointwise convolution followed by a depthwise convolution to generate an output of the second separable convolution;

after the second separable convolution, a tertiary pointwise convolution performed on a combined feature map formed by concatenating a first feature map which is formed by up-sampling the output of the second separable convolution and a second feature map which is formed by performing a pointwise convolution on the output of the selected one of said at least one convolution layer;

after the tertiary pointwise convolution, an activation function; and a loss function after the activation function.

In the illustrated arrangement, the activation function is a softmax function.

In the illustrated arrangement, the loss function is a mean intersection-over-union loss function.

In the illustrated arrangement, each one of the at least one convolution layer includes a final rectified linear unit activation function after which an output of said each one of the at least one convolution layer is generated.

In the illustrated arrangement, each separable convolution of the at least one separable convolution module is followed by a rectified linear unit activation function.

In the illustrated arrangement, the pooling module includes an activation function and, for training the convolutional neural network, a dropout layer thereafter.

In another aspect, and as described hereinbefore, the present invention generally relates to a pure deep learning method for segmenting concrete cracks in images which may achieve real-time performance while effectively negating a wide range of various complex backgrounds and crack-like features. The method comprises implementing a convolutional neural network (CNN) comprising standard convolutions, densely connected separable convolution (DenSep) modules, a modified atrous spatial pyramid pooling (ASPP) module, and a decoder module. This CNN, which is also referred to herein as a semantic damage detection network (SDDNet), is trained on a manually created crack dataset, and the trained network records the mean intersection-over-union (mIoU) of 0.846 on the test set. Each test image is analyzed, and the representative segmentation results are presented. The results show that the CNN segments cracks effectively unless the features are too faint. The CNN is also compared with other algorithms, whereby it is shown that it returns better evaluation metrics even though its number of parameters is 88 times less than in the compared models. In addition, the model processes in real-time (36 FPS) images at 1025 512 pixels, which is 46 times faster than in a recent work.

The scope of the claims should not be limited by the preferred embodiments set forth in the examples but should be given the broadest interpretation consistent with the specification as a whole.

REFERENCES

[1] Y.-J. Cha, W. Choi, and O. Bu"yu"ko"ztu"rk, "Deep learning-based crack damage detection using convolutional neural networks," Computer-Aided Civil and Infrastructure Engineering, vol. 32, DOI 10.1111/mice.12263, no. 5, pp. 361-378, May. 2017.

[2] Y. LeCun, Y. Bengio, and G. Hinton, "Deep learning," nature, vol. 521, no. 7553, p. 436, 2015.

[3] I. Goodfellow, Y. Bengio, and A. Courville, Deep Learning. MIT Press, 2016, http://www.deeplearningbook.org.

[4] D. Steinkraus, I. Buck, and P. Simard, "Using gpus for machine learning algorithms," in ICDAR'05, DOI 10.1109/ICDAR.2005.251, pp. 1115-1120. IEEE, 2005.

[5] K. Simonyan and A. Zisserman, "Very deep convolutional networks for large-scale image recognition," arXiv preprint arXiv:1409.1556, 2014.

[6] K. He, X. Zhang, S. Ren, and J. Sun, "Deep residual learning for image recognition," in Proceedings of the IEEE conference on computer vision and pattern recognition, pp. 770-778, 2016.

[7] F. Chollet, "Xception: Deep learning with depthwise separable convolu-tions," in Proceedings of the IEEE conference on computer vision and pattern recognition, pp. 1251-1258, 2017.

[8] G. Huang, Z. Liu, L. Van Der Maaten, and K. Q. Weinberger, "Densely connected convolutional networks," in Proceedings of the IEEE confer-ence on computer vision and pattern recognition, pp. 4700-4708, 2017.

[9] J. Yosinski, J. Clune, Y. Bengio, and H. Lipson, "How transferable are features in deep neural networks?" in Advances in neural information processing systems, pp. 3320-3328, 2014.

[10] B. Li, K. C. Wang, A. Zhang, E. Yang, and G. Wang, "Automatic clas-sification of pavement crack using deep convolutional neural network," International Journal of Pavement Engineering, pp. 1-7, 2018.

[11] N. T. H. Nguyen, T. H. Le, S. Perry, and T. T. Nguyen, "Pavement crack detection using convolutional neural net-work," in Proceedings of the Ninth International Symposium on Information and Communication Technology, pp. 251-256. ACM, 2018.

[12] D. Kang and Y.-J. Cha, "Autonomous uavs for structural health moni-toring using deep learning and an ultrasonic beacon system with geo-tagging," Computer-Aided Civil and Infrastructure Engineering, vol. 33, DOI 10.1111/mice.12375, no. 10, pp. 885-902, October 2018.

[13] S. Ren, K. He, R. Girshick, and J. Sun, "Faster r-cnn: Towards real-time object detection with region proposal networks," in Advances in neural information processing systems, pp. 91-99, 2015.

[14] Y.-J. Cha, W. Choi, G. Suh, S. Mahmoudkhani, and O. Bu"yu"ko"ztu"rk, "Autonomous structural visual inspection using region-based deep learn-ing for detecting multiple damage types," Computer-Aided Civil and Infrastructure Engineering, vol. 33, DOI 10.1111/mice.12334, no. 9, pp. 731-747, September 2018.

[15] H. Maeda, Y. Sekimoto, T. Seto, T. Kashiyama, and H. Omata, "Road damage detection and classification using deep neural networks with smartphone images," Computer-Aided Civil and Infrastructure Engineer-ing, vol. 33, DOI 10.1111/mice.12387, no. 12, pp. 1127-1141, December 2018.

[16] Y. Xue and Y. Li, "A fast detection method via region-based fully convolutional neural networks for shield tunnel lining defects," Computer-Aided Civil and Infrastructure Engineering, vol. 33, DOI 10.1111/mice.12367, no. 8, pp. 638-654, August 2018.

[17] O. Ronneberger, P. Fischer, and T. Brox, "U-net: Convolutional networks for biomedical image segmentation," in International Conference on Medical image computing and computer-assisted intervention, pp. 234-241. Springer, 2015.

[18] M. Siam, S. Elkerdawy, M. Jagersand, and S. Yogamani, "Deep se-mantic segmentation for automated driving: Taxonomy, roadmap and challenges," in 2017 IEEE 20th International Conference on Intelligent Transportation Systems (ITSC), pp. 1-8. IEEE, 2017.

[19] F. Nayyeri, L. Hou, J. Zhou, and H. Guan, "Foreground-background separation technique for crack detection," Computer-Aided Civil and Infrastructure Engineering, 2018.

[20] X. Yang, H. Li, Y. Yu, X. Luo, T. Huang, and X. Yang, "Automatic pixel-level crack detection and measurement using fully convolutional network," Computer-Aided Civil and Infrastructure Engineering, vol. 33, DOI 10.1111/mice.12412, no. 12, pp. 1090-1109, December 2018.

[21] A. Zhang, K. C. Wang, Y. Fei, Y. Liu, S. Tao, C. Chen, J. Q. Li, and B. Li, "Deep learning-based fully automated pavement crack detection on 3d asphalt surfaces with an improved cracknet," Journal of Computing in Civil Engineering, vol. 32, DOI 10.1061/(ASCE)CP.1943-5487.0000775, no. 5, p. 04018041, September 2018.

[22] C. V. Dung et al., "Autonomous concrete crack detection using deep fully convolutional neural network," Automation in Construction, vol. 99, DOI 10.1016/j.autcon.2018.11.028, pp. 52-58, March 2019.

[23] F. Ni, J. Zhang, and Z. Chen, "Pixel-level crack delineation in images with convolutional feature fusion," Structural Control and Health Mon-itoring, vol. 26, DOI 10.1002/stc.2286, no. 1, p. e2286, January 2019.

[24] G. H. Beckman, D. Polyzois, and Y.-J. Cha, "Deep learning-based automatic volumetric damage quantification using depth camera," Au-tomation in Construction, vol. 99, DOI 10.1016/j.autcon.2018.12.006, pp. 114-124, March 2019.

[25] J. Deng, W. Dong, R. Socher, L.-J. Li, K. Li, and L. Fei-Fei, "Imagenet: A large-scale hierarchical image database," 2009.

[26] L.-C. Chen, Y. Zhu, G. Papandreou, F. Schroff, and H. Adam, "Encoder decoder with atrous separable convolution for semantic image segmen-tation," in Proceedings of the European Conference on Computer Vision (ECCV), pp. 801-818, 2018.

[27] V. Badrinarayanan, A. Kendall, and R. Cipolla, "Segnet: A deep con-volutional encoder-decoder architecture for image segmentation," IEEE transactions on pattern analysis and machine intelligence, vol. 39, no. 12, pp. 2481-2495, 2017.

[28] A. G. Howard, M. Zhu, B. Chen, D. Kalenichenko, W. Wang, T. Weyand, M. Andreetto, and H. Adam, "Mobilenets: Efficient convo-lutional neural networks for mobile vision applications," arXiv preprint arXiv:1704.04861, 2017.

[29] S. Ioffe and C. Szegedy, "Batch normalization: Accelerating deep network training by reducing internal covariate shift," arXiv preprint arXiv:1502.03167, 2015.

[30] V. Nair and G. E. Hinton, "Rectified linear units improve restricted boltz-mann machines," in Proceedings of the 27th international conference on machine learning (ICML-10), pp. 807-814, 2010.

[31] V. Dumoulin and F. Visin, "A guide to convolution arithmetic for deep learning," arXiv preprint arXiv: 1603.07285, 2016.

[32] L.-C. Chen, G. Papandreou, F. Schroff, and H. Adam, "Rethinking atrous convolution for semantic image segmentation," arXiv preprint arXiv:1706.05587, 2017.

[33] N. Srivastava, G. Hinton, A. Krizhevsky, I. Sutskever, and R. Salakhutdinov, "Dropout: a simple way to prevent neural networks from over-fitting," The Journal of Machine Learning Research, vol. 15, no. 1, pp. 1929-1958, 2014.

[34] C. Sim, E. Villalobos, J. P. Smith, P. Rojas, S. Pujol, A. Puranam, and L. Laughery, "Performance of low-rise reinforced concrete buildings in the 2016 ecuador earthquake," 2016.

[35] M. Cordts, M. Omran, S. Ramos, T. Rehfeld, M. Enzweiler, R. Be-nenson, U. Franke, S. Roth, and B. Schiele, "The cityscapes dataset for semantic urban scene understanding," in Proceedings of the IEEE conference on computer vision and pattern recognition, pp. 3213-3223, 2016.

[36] M. Abadi, P. Barham, J. Chen, Z. Chen, A. Davis, J. Dean, M. Devin, S. Ghemawat, G. Irving, M. Isard et al., "Tensorflow: A system for large-scale machine learning," in 12th USENIX Symposium on Operating Systems Design and Implementation (OSDI 16), pp. 265-283, 2016.

[37] J. Long, E. Shelhamer, and T. Darrell, "Fully convolutional networks for semantic segmentation," in Proceedings of the IEEE conference on computer vision and pattern recognition, pp. 3431-3440, 2015.

[38] M. A. Rahman and Y. Wang, "Optimizing intersection-over-union in deep neural networks for image segmentation," in International symposium on visual computing, pp. 234-244. Springer, 2016.

[39] D. P. Kingma and J. Ba, "Adam: A method for stochastic optimization," arXiv preprint arXiv:1412.6980, 2014.

[40] L. N. Smith, "Cyclical learning rates for training neural networks," in 2017 IEEE Winter Conference on Applications of Computer Vision (WACV), pp. 464-472. IEEE, 2017.

[41] Y. Liu, J. Yao, X. Lu, R. Xie, and L. Li, "Deeperack: A deep hierarchical feature learning architecture for crack segmentation," Neurocomputing, vol. 338, DOI 10.1016/j.neucom.2019.01.036, pp. 139-153, 2019.

TABLE 1

Number of computations

| No. of conv. | DenSep | | Standard conv. | |
| --- | --- | --- | --- | --- |
| | Oper. | Mults. | Oper. | Mults. |
| 1 | PW | $0.5K^2D^2$ | PW | $0.5K^2D^2$ |
| | DW | $4.5K^2D$ | Conv. | $2.25K^2D^2$ |
| 2 | PW | $0.75K^2D^2$ | PW | $0.75K^2D^2$ |
| | DW | $4.5K^2D$ | Conv. | $2.25K^2D^2$ |
| 3 | PW | $K^2D^2$ | PW | $K^2D^2$ |
| | DW | $4.5K^2D$ | Conv. | $2.25K^2D^2$ |
| 4 | PW | $1.25K^2D^2$ | PW | $1.25K^2D^2$ |
| | DW | $4.5K^2D$ | Conv. | $2.25K^2D^2$ |
| 5 | PW | $3.0K^2D^2$ | PW | $3.0K^2D^2$ |
| | DW | $4.5K^2D$ | Conv. | $9.0K^2D^2$ |
| Total | | $K^2D(6.5D + 27)$ | | $K^2D(24.5D)$ |

TABLE 2

Hyperparameters for training SDD-R6D64

| | Cityscape dataset | Crack200 dataset |
| --- | --- | --- |
| $lr_1/lr_2$/step | 0.003/0.00001/2000 | 0.001/0.00001/2000 |
| Input size | 513 × 513 (1009 × 1009$^a$) | 513 × 513 (1009 × 1009$^a$) |
| Batch size | 32(8$^a$) | 32(8$^a$) |

$^a$these values indicate the changed input size after the convergance of each model

TABLE 3

Modified Cityscape Dataset

| Label | Object | # of image |
| --- | --- | --- |
| 1 | Road, sidewalk, parking | 3438 |
| 2 | Building, wall, bridge | 3448 |
| 3 | Pole, traffic, light and sign | 3448 |
| 4 | Tree | 3377 |
| 5 | Human | 2941 |
| 6 | Vehicle | 3329 |
| 0 | Other | 3475 |

TABLE 4

Comparison of SDD-R6D64 with different training strategies

| Model variation | Input size | Pre. | Re. | F1 | mIoU |
| --- | --- | --- | --- | --- | --- |
| Fine-tuned with ASPP | 1009 × 1009 | 0.805 | 0.834 | 0.819 | 0.846 |
| | 513 × 513 | 0.770 | 0.839 | 0.803 | 0.835 |
| Fine-tuned without ASPP | 1009 × 1009 | 0.752 | 0.855 | 0.800 | 0.833 |
| | 513 × 513 | 0.756 | 0.844 | 0.798 | 0.831 |
| Scratch with ASPP | 513 × 513 | 0.785 | 0.802 | 0.793 | 0.827 |

TABLE 5

DeepCrack vs SDD-R6D32

| Model variation | Par. (M) | Pre. | Re. | F1 | mIoU | FPS |
| --- | --- | --- | --- | --- | --- | --- |
| DeepCrack-CRF | 14 | 0.868 | 0.846 | 0.857 | 0.836 | 2.500 |
| DeepCrack-GF | | 0.852 | 0.866 | 0.859 | 0.859 | 8.475 |
| DeepCrack-Aug | | 0.861 | 0.869 | 0.865 | 0.802 | 9.174 |
| SDD-R6D32 | 0.160 | 0.871 | 0.870 | 0.870 | 0.879 | 75.816 |

TABLE 6

Cross-test results with SDD-R6D64

| | DeepCrack's test set | | | | Crack200's test set | | | |
|---|---|---|---|---|---|---|---|---|
| Train set | Pre. | Re. | F1 | mIoU | Pre. | Re. | F1 | mIoU |
| DeepCrack | 0.874[a] | 0.870[a] | 0.872[a] | 0.880[a] | 0.213[b] | 0.561[b] | 0.309[b] | 0.587[b] |
| Crack200 | 0.875[c] | 0.870[c] | 0.872[c] | 0.881[c] | 0.805[d] | 0.834[d] | 0.819[d] | 0.846[d] |

[a]SDD trained and test on the DeepCrack's data
[b]SDD trained on DeepCrack's data; test on Applicant's data
[c]SDD trained on Applicant's data; test on the DeepCrack's test data
[d]SDD trained and test on the Crack200

TABLE 7

Processing time of SDD-R6D64

| Image size | Milliseconds/image (FPS) |
|---|---|
| 1920 × 1080 | 80.40 (12) |
| 1025 × 512 | 27.50 (36) |
| 720 × 480 | 18.10 (55) |

The invention claimed is:

1. A computer-implemented method of analyzing an image to segment an article of interest in the image, comprising:
receiving the image having a width of $n_1$ pixels, a height of $n_2$ pixels and a depth of d channels;
processing the image using a machine learning algorithm configured to segment the article of interest, the machine learning algorithm comprising a convolutional neural network including:
at least one convolution layer;
after said at least one convolution layer, at least one separable convolution module comprising a series of separable convolutions, each separable convolution comprising a depthwise convolution and a pointwise convolution;
after said at least one separable convolution module, a pooling module; and
a decoder module after the pooling module;
and displaying the image with location of the article of interest being indicated if determined to be present by the machine learning algorithm.

2. The computer-implemented method of claim 1 wherein said at least one convolution layer comprises:
a first convolution layer having $f_1$ filters each having a width of $w_1$ pixels, a height of $h_1$ pixels and a depth of $d_1$ channels with a stride of $s_1$; and
after the first convolution layer, a second convolution layer having $f_2$ filters each having a width of $w_2$ pixels, a height of $h_2$ pixels and a depth of $d_2$ channels with a stride of $s_2$;
wherein $f2=nf_1$;
wherein $s2=ns_1$;
wherein n is an integer.

3. The computer-implemented method of claim 1 wherein said at least one separable convolution module comprises:
a first separable convolution module comprising a series of $SC_1$ separable convolutions each with a stride of one except for a last one of said series which has a stride of $S_3$;
after the first separable convolution module, a second separable convolution module comprising a series of $SC_2$ separable convolutions each with a stride of one except for a last one of said series which has a stride of $s_4$;
after the second separable convolution module, a third separable convolution module comprising a series of $SC_3$ separable convolutions each with a stride of one except for a last one of said series which has a stride of $s_5$;
after the third separable convolution module, a fourth separable convolution module comprising a series of $SC_4$ separable convolutions each with a stride of one except for a last one of said series which has a stride of $s_6$;
each depthwise convolution filter having a width of 1 pixels, a height of DH pixels and a depth of $n_d$ channels; and
each pointwise convolution filter having a width of 1 pixel, a height of 1 pixel and a depth of $n_d$ channels.

4. The computer-implemented method of claim 3 wherein each of $s_3$, $s_4$, and $s_5$ are equal to $N_1$ and $s_6$ is equal to $N_2$.

5. The computer-implemented method of claim 3 wherein the fourth separable convolution module is performed x times, where x is an integer greater than two.

6. The computer-implemented method of claim 1 wherein, in each separable convolution of the at least one separable convolution module, the depthwise convolution is performed after the pointwise convolution.

7. The computer-implemented method of claim 6 wherein, in respect of each separable convolution module, the pointwise convolution of each one of the series of separable convolutions after a first one thereof is performed on a combined feature map formed by concatenating an output feature map of an immediately previous one of the series of separable convolution with an input feature map of each earlier one of the series of separable convolutions.

8. The computer-implemented method of claim 1 wherein the pooling module comprises:
an initial pointwise convolution;
a series of parallel-connected atrous separable convolutions after the initial pointwise convolution, each atrous separable convolution comprising a pointwise convolution and a dilated depthwise convolution after said pointwise convolution; and
a final pointwise convolution after the series of atrous separable convolutions.

9. The computer-implemented method of claim 8 wherein the series of atrous separable convolutions comprises:
a first atrous separable convolution with a dilated depthwise convolution having a dilation rate of $r_1$;
a second atrous separable convolution with a dilated depthwise convolution having a dilation rate of $r_2$, wherein $r_2=r_1+y$;

a third atrous separable convolution with a dilated depthwise convolution having a dilation rate of $r_3$, wherein $r_3=r_2+y$; and a fourth atrous separable convolution with a dilated depthwise convolution having a dilation rate of r4, wherein $r_4=r_3+y$.

10. The computer-implemented method of claim 8 wherein the initial and final pointwise convolutions and each atrous separable convolution is followed by a rectified linear unit activation function.

11. The computer-implemented method of claim 1 wherein the decoder module is configured to receive as its input an output of the pooling module, an output of a selected one of said at least one convolution layer, and an output of a selected one of said at least one separable convolution module.

12. The computer-implemented method of claim 11 wherein the decoder module comprises:

a first separable convolution comprising a pointwise convolution performed on a combined feature map formed by concatenating a first feature map which is formed by up-sampling the output of the pooling module and a second feature map which is formed by performing a pointwise convolution on the output of the selected one of said at least one separable convolution module, followed by a depthwise convolution;

after the first separable convolution, a second separable convolution comprising a pointwise convolution followed by a depthwise convolution to generate an output of the second separable convolution;

after the second separable convolution, a tertiary pointwise convolution performed on a combined feature map formed by concatenating a first feature map which is formed by up-sampling the output of the second separable convolution and a second feature map which is formed by performing a pointwise convolution on the output of the selected one of said at least one convolution layer;

after the tertiary pointwise convolution, an activation function; and a loss function after the activation function.

13. The computer-implemented method of claim 12 wherein the activation function is a softmax function.

14. The computer-implemented method of claim 12 wherein the loss function is a mean intersection-over-union loss function.

15. The computer-implemented method of claim 1 wherein each one of the at least one convolution layer includes a final rectified linear unit activation function after which an output of said each one of the at least one convolution layer is generated.

16. The computer-implemented method of claim 1 wherein each separable convolution of the at least one separable convolution module is followed by a rectified linear unit activation function.

17. The computer-implemented method of claim 1 wherein the pooling module includes an activation function and, for training the convolutional neural network, a dropout layer thereafter.

* * * * *